United States Patent [19]

Stacy et al.

[11] Patent Number: 4,716,463
[45] Date of Patent: Dec. 29, 1987

[54] POWER DOWN SENSE CIRCUIT

[75] Inventors: Carl W. Stacy, Elmwood Park; William Chamberlain, Lombard, both of Ill.

[73] Assignee: Zenith Electronics Corporation, Glenview, Ill.

[21] Appl. No.: 922,640

[22] Filed: Oct. 24, 1986

[51] Int. Cl.$^4$ .............................................. H04N 5/63
[52] U.S. Cl. ...................... 358/190; 455/343; 364/707; 365/227; 358/903
[58] Field of Search ............... 358/190, 903; 364/707, 364/705; 365/227, 229; 455/217, 127, 343

[56] References Cited

U.S. PATENT DOCUMENTS

| | | | |
|---|---|---|---|
| 4,227,257 | 10/1980 | Sato | 455/343 |
| 4,281,349 | 7/1981 | George | 455/343 |
| 4,457,021 | 6/1984 | Belisomi | 455/343 |
| 4,523,295 | 6/1985 | Zato | 358/190 |

Primary Examiner—Tommy P. Chin

[57] ABSTRACT

A low voltage sense circuit for a microprocessor controlled television receiver includes a 5 volt regulator having a large electrolytic capacitor coupled across its output, which is the power input terminal of a microprocessor. The microprocessor includes a sleep terminal for initiating operation in a minimum power consumption mode. The 12 volt input to the 5 volt regulator is coupled to the bias circuit of a PNP transistor that includes a Zener diode and which is in saturation as long as the input voltage to the 5 volt regulator is greater than the breakdown voltage of the Zener diode. The collector output of the transistor is connected to the sleep terminal of the microprocessor. When the transistor is driven out of saturation, an appropriate voltage change is developed at the sleep terminal for causing the microprocessor to switch to its low power sleep mode.

6 Claims, 2 Drawing Figures

POWER DOWN SENSE CIRCUIT

BACKGROUND OF THE INVENTION AND PRIOR ART

This invention relates generally to apparatus that is operable in a low power standby or "sleep" mode in the event of a power failure and specifically to television receivers incorporating such a feature.

Most modern television receivers incorporate a microprocessor for performing one or more ancillary functions as well as conventional tuning. For example, homing channels may be programmed into the receiver such that each time the receiver is turned on, it will tune either to a specific channel or to the channel it was previously tuned to. Also, clock and channel number displays are controlled and operated by the microprocessor. In many hotel/motel receivers, AM/FM clock radios are incorporated and controlled by the microprocessor. The microprocessor includes a memory that needs to be refreshed periodically. Normally, this is accomplished by internal apparatus that operates from the power line and is not a problem as long as the receiver is not disconnected from the line or the power line voltage does not drop significantly. In particular, a microprocessor identified as Matsushita No. MN 15251G10, incorporates two clock signals, one of approximately 4 MHz and another of 32 KHz. The 4 MHz clock is the normal timing clock and is operable when the receiver is operating normally, that is, it is receiving normal input voltage. The 32 KHz clock is activated by an appropriate signal applied to a low voltage sense pin on the microprocessor to force the microprocessor into a so-called sleep mode. In the sleep mode, only minimal power demands are made by the microprocessor to keep certain memory and clock timing circuits alive for as long as possible during a power failure.

There are many circuits used in consumer electronic devices for maintaining essential timing and memory functions during a power outage. For example, many clock radios incorporate a nickel cadmium battery for maintaining the timekeeping function of the clock during a power outage, even though the display may be extinguished. An extended power outage will, of course, ultimately result in failure of this feature once the battery is discharged. The battery is automatically kept charged from the power line during normal operation of the apparatus.

The present invention uses an already present electrolytic capacitor at the power input of the microprocessor as the source of energy for continuing sleep mode operation of the microprocessor during a power failure. This capacitor is coupled across the output of the 5 volt regulator that supplies regulated voltage to the microprocessor. The present invention forces the microprocessor into its sleep mode in the event of a low or zero voltage condition while the capacitor is fully charged and still capable of supporting the essential timekeeping and memory functions of the microprocessor.

OBJECTS OF THE INVENTION

A principal object of the invention is to provide a novel microprocessor controlled television receiver.

Another object of the invention is to provide a microprocessor controlled television receiver in which the receiver may be disconnected from a power source for extended periods of time without loss of essential memory or functions.

A further object of the invention is to provide a novel, low power sensing circuit for a microprocessor controlled television receiver.

BRIEF DESCRIPTION OF THE DRAWING

These and other objects and advantages of the invention will be apparent upon reading the following description in conjunction with the drawing in which.

DESCRIPTION OF THE PREFERRED EMBODIMENT

Figure 1:
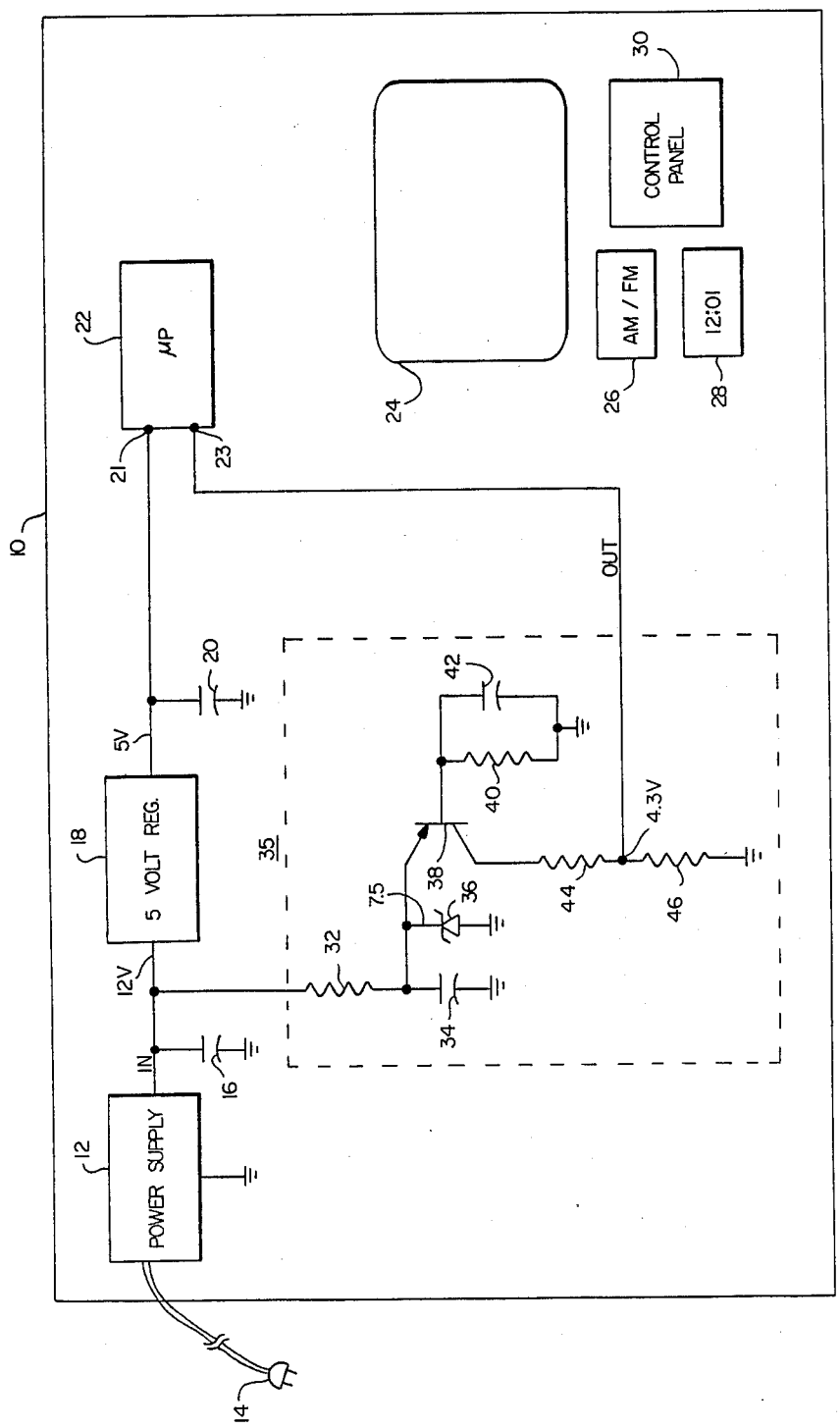
FIG. 1 represents a partial schematic, partial block diagram of a TV receiver constructed in accordance with the invention.

In FIG. 1, a television receiver 10, which is generally shown as a large, rectangular block, includes a power supply 12 adapted for coupling to a source of AC line voltage by means of a conventional line cord and plug 14. The output of the power supply, labelled IN, is connected to an electrolytic capacitor 16 and feeds a 5 volt regulator circuit 18 which, in turn, supplies another electrolytic capacitor 20 connected to its output and to the input terminal 21 of a microprocessor 22. The television receiver is illustrated as incorporating a picture tube 24, an AM/FM radio apparatus 26, a timekeeping clock 28 (which may be part of the radio) and a control panel 30 for programming of the microprocessor and for manual control of the receiver. Microprocessor 22 is also equipped with a low power sense terminal 23, also referred to as a sleep terminal which, when supplied with an appropriate signal, causes the microprocessor to revert to a sleep or minimal power consumption mode of operation in which only certain essential memory and timekeeping functions are maintained. The output of the power supply is connected through a resistor 32 and a capacitor 34 to ground. Resistor 32 and capacitor 34, which are part of a detector or sense circuit 35, have their junction connected to a Zener diode 36 which is connected to the emitter of a PNP transistor 38 having its collector connected to ground through a pair of resistors 44 and 46. The junction of resistors 44 and 46 is connected to terminal 23 on the microprocessor 22 and is labelled OUT. The base of transistor 38 is biased by being returned to ground through the parallel connection of a resistor 40 and a capacitor 42. Sense circuit 35 includes all of the above components as indicated by the dashed line box.

Under normal operating conditions, that is with a source of normal AC line voltage connected to plug 14, power supply 12 develops DC operating potential for receiver 10 and microprocessor 22. Approximately 12 volts DC is developed across capacitor 16 and supplied to the input of regulator 18. As indicated, the output of regulator 18 is 5 volts and capacitor 20, which may have a value on the order of one farad, is fully charged to 5 volts D.C. The current drain of microprocessor 22 on the 5 volt regulator is about 500 milliamperes. In its sleep mode, the microprocessor current requirement falls to about 100 microamperes. Consequently, in the sleep mode, electrolytic capacitor 20 can supply the power requirement of microprocessor 22 for a significant time period, on the order of several hours.

Under steady state conditions, that is, with transistor 38 saturated, the sense circuit is immune to noise, such as power supply hum, radio frequency interference (RFI), switching noise and the like on the 12 volt supply that does not cause the supply voltage to drop below the voltage set by the Zener diode 36. The sense circuit will only trigger if the voltage at the emitter of transistor 38 drops below the Zener diode voltage of 7.5 volt DC. Capacitor 34 also helps eliminate false triggering due to any strong RFI that the Zener diode does not shunt to ground. The ability to reject low frequency noise is determined by the RC time constant of resistor 40 and capacitor 42 connected to the base of transistor 38. The combination of the Zener diode 36 and capacitor 34 working against the series resistor 32, and the large RC time constant of the base of transistor 38 makes this circuit immune to noise over a large frequency range.

Figure 2:
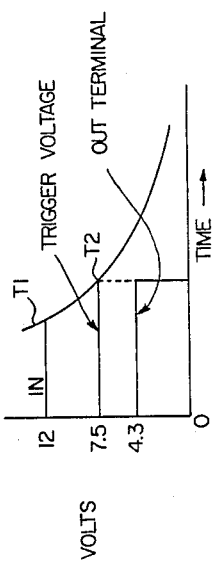
FIG. 2 is a waveform illustrating operation of the sense circuit of the invention.

Reference to FIG. 2 indicates the output voltage of power supply 12 remaining steady at 12 volts until a time T1, when a power failure is assumed. As capacitor 16 continues to supply the normal power requirements of microprocessor 22, its voltage begins to fall since it is no longer being supplied from power supply 12. At the regulating voltage of Zener diode 36, which is indicated as 7.5 volts, transistor 38, which is normally in saturation, cuts off when its emitter voltage becomes too low to support conduction in the transistor. This action is abrupt due to the back bias provided by capacitor 42. The OUT voltage supplied from the collector of transistor 38 to the low voltage sense pin 23 of microprocessor 22 immediately falls from its normal 4.3 volts to zero. This voltage drop or trigger signal is sensed by microprocessor 22 and causes it to switch to its sleep mode with its drastically reduced power requirements. Regulator 18 continues to regulate as long as the sum of its internal voltage drop and its regulated output voltage is less than the voltage at its input. At some point, regulator 18 ceases to regulate and all further power supplied to microprocessor 22 is from electrolytic capacitor 20. Since the microprocessor is operating in its low power sleep mode, the current drain from capacitor 20 is very, very small and the microprocessor will accurately continue its timekeeping and preserve its essential memory for a significant period of time. Assuming that power is returned to receiver 10 before the charge on capacitor 20 is depleted, system operation will return to normal with the voltage at the input of regulator 18 again rising, transistor 38 being driven into saturation, the voltage on low voltage sense pin 23 returning to normal and microprocessor 22 reverting to normal operation.

What has been described is a novel, low cost power down sense circuit, that is immune to noise over a large frequency range, for signalling a microprocessor to switch to a sleep mode. It will be recognized that numerous modifications and changes in the described embodiment of the invention may be made by those skilled in the art without departing from its true spirit and scope. The invention is to be limited only as defined in the claims.

What is claimed is:

1. A television receiver including a microprocessor having memory and timekeeping functions, said microprocessor having a sleep mode activated by a trigger voltage applied to a sleep terminal for operating said microprocessor with minimal power consumption to maintain said memory and timekeeping functions during a power failure comprising:

a power supply including a voltage regulator;

a filter capacitor coupled to the output of said voltage regulator and supplying a power input for said microprocessor; and sense means coupled between the input of said regulator and the sleep terminal of said microprocessor for developing said trigger voltage for said microprocessor in the event said input voltage to the regulator falls below a predetermined level.

2. The receiver of claim 1 wherein said sense means comprise a PNP transistor having a Zener diode coupled to its input, said Zener diode being set to trigger before said regulator goes out of regulation.

3. The receiver of claim 2 wherein said PNP transistor is normally operated in a state of saturation and produces an output voltage that is coupled to said sleep terminal of said microprocessor.

4. The receiver of claim 3 wherein said output voltage goes to zero to develop said trigger voltage when said transistor is driven out of saturation.

5. The receiver of claim 4 wherein said sense means further includes a series connected resistor and capacitor coupled to the input of said regulator, with said capacitor being connected in parallel with said Zener diode for rejecting noise over a large frequency range.

6. A television receiver including a microprocessor having memory and timekeeping functions, said microprocessor including a sleep mode that is activated by a trigger signal voltage on a sleep terminal for operating the microprocessor in a minimum power consumption mode to maintain said memory and timekeeping functions during a power failure comprising:

a power supply including a regulator having its output coupled to the input of said microprocessor for supplying 5 volt regulated power thereto;

a large filter capacitor coupled across the output of said voltage regulator;

a series resistor and capacitor network coupled between the input of said voltage regulator and ground;

a PNP transistor having its emitter connected to the junction of said resistor and capacitor and its collector connected through a load resistor to ground;

a Zener diode connected across the emitter of said transistor and ground for keeping said transistor in saturation so long as the input voltage to said regulator is greater than the breakdown voltage of said Zener diode; and means connecting the collector of said transistor to said sleep terminal of said microprocessor whereby, when the input voltage of said regulator drops to said breakdown voltage of said Zener diode, said transistor is driven out of saturation and said trigger signal voltage is applied to said sleep terminal for causing said microprocessor to operate in its sleep mode.

* * * * *